United States Patent [19]

Richter

[11] Patent Number: 5,175,539
[45] Date of Patent: Dec. 29, 1992

[54] INTERCONNECTING NETWORK

[75] Inventor: Harald Richter, Garching, Fed. Rep. of Germany

[73] Assignee: Max-Planck-Gesellschaft zur Foerderung der Wissenschaften E.V., Fed. Rep. of Germany

[21] Appl. No.: 617,914

[22] Filed: Nov. 21, 1990

Related U.S. Application Data

[63] Continuation of Ser. No. 305,297, Feb. 1, 1989, abandoned.

[30] Foreign Application Priority Data

Jan. 24, 1989 [DE] Fed. Rep. of Germany ... 8900757[U]

[51] Int. Cl.⁵ .............................................. H04J 3/00
[52] U.S. Cl. ................................ 340/825.8; 340/826; 340/825.79; 370/54; 370/94.1; 379/272
[58] Field of Search ........... 340/825.8, 825.89, 825.79, 340/825.03, 826; 370/58.1, 54, 58.2, 94.3, 94.1; 307/112; 379/271, 272, 273, 274, 277, 291

[56] References Cited

U.S. PATENT DOCUMENTS

| | | | |
|---|---|---|---|
| 3,546,390 | 12/1970 | Hackenberg et al. | 340/825.8 |
| 3,674,938 | 7/1972 | Jacob | 340/825.8 |
| 3,842,214 | 10/1974 | Altenburger et al. | 340/825.8 |
| 3,928,730 | 12/1975 | Aagaard et al. | 340/825.8 |
| 4,394,541 | 7/1983 | Seiden | 340/825.79 |
| 4,539,564 | 9/1985 | Smithson | 340/825.79 |
| 4,734,907 | 3/1988 | Turner | 370/94.1 |
| 4,837,855 | 6/1989 | Hajikano et al. | 340/825.8 |

OTHER PUBLICATIONS

"Computer Architecture and Parallel Processing", K. Hwang and F. A. Briggs, McGraw Hill Intl. Editions, Computer Science Series (1984); pp. 332, 333 and 338.
"On the Rearrangeability of 2(log₂N)−1 Stage Permutation Networks", Kyungsook Yoon Lee, IEEE Transactions on Computers, vol. C-34, No. 5, May, 1985, pp. 412–425.
"Parallel Processing and Interconnection Networks", Chuan-lin Wu, Department of Electrical and Computing Engineering, The University of Texas at Austin, Aug. 20, 1985, pp. 50–51.

Primary Examiner—Donald J. Yusko
Assistant Examiner—Peter Weissman
Attorney, Agent, or Firm—Brumbaugh, Graves, Donohue & Raymond

[57] ABSTRACT

Interconnecting network for simultaneous selective connecting of each of N inputs to one of N outputs has an input section which includes the inputs and contains at least the consecutive stages 1 to n−1 of a n-stage baseline network and has N outputs, and an output section which has N inputs which are connected to the N outputs of the input section, includes a n-stage baseline network and has N outputs which form the outputs of the interconnecting network. The order of the n−1 stages following the inputs is the same in both baseline networks.

10 Claims, 10 Drawing Sheets

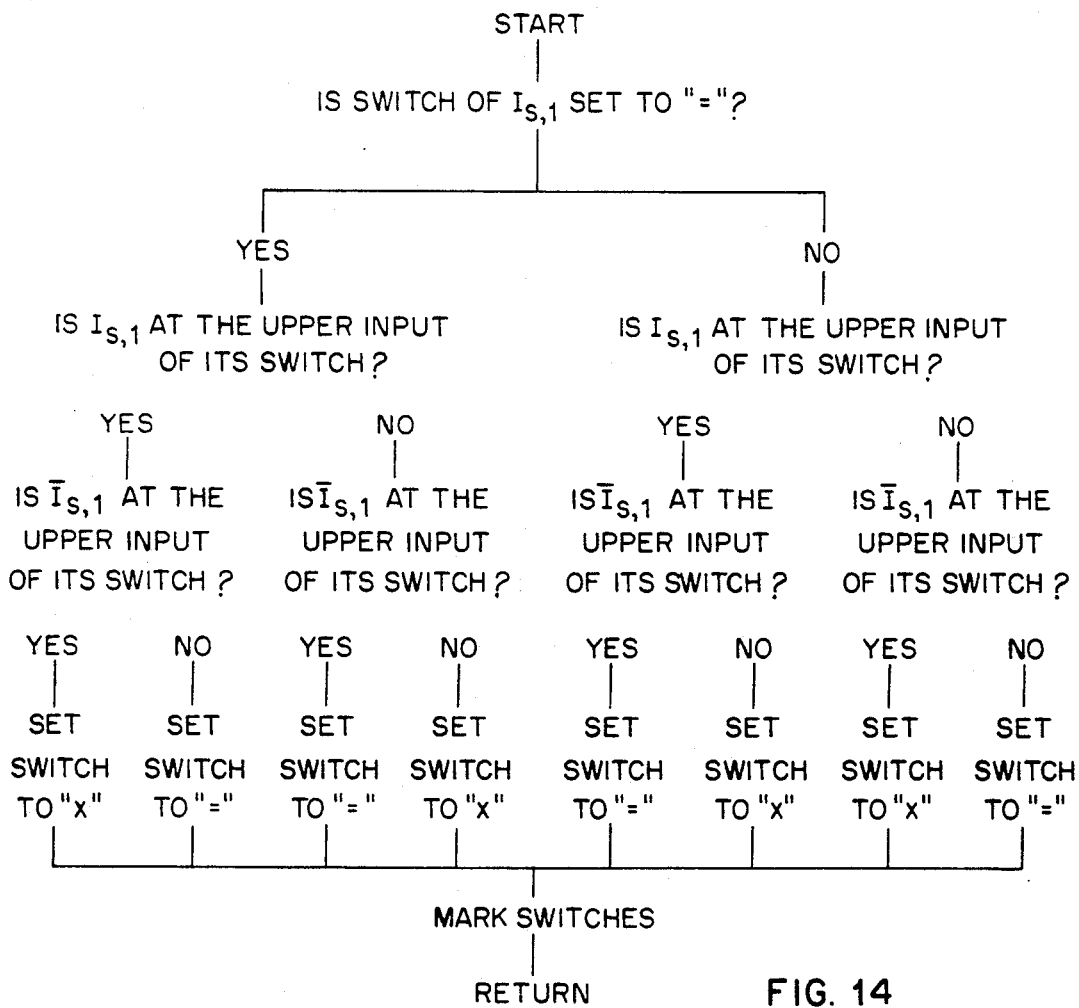

INTERCONNECTING NETWORK

This application is a continuation of application Ser. No. 07/305,297, filed Feb. 1, 1989, now abandoned.

BACKGROUND OF THE INVENTION

1. Field of the Invention

The present invention relates to a permutation or interconnecting network for simultaneous selective connection of each of N inputs to an individual output of N outputs.

2. Description of the Related Art

Interconnecting networks are required for example when a plurality of signal sources are to be connected individually by line or physically to an equal number of users. Interconnecting networks should generally be blockage-free, i.e. the connection of any input to any output does not block the possibility of connecting any other input with any other output. Furthermore, it is often required that interconnecting networks can easily be expanded as regards the number of their inputs and outputs. For economy reasons interconnecting networks should have as few switches as possible.

A typical interconnecting network is the crossbar switch. Although it can easily be expanded it requires a very great number, that is $N^2$ switches. The interconnecting network which best fulfills the above conditions so far is the Benes network: it is blockage-free. It contains only a minimum of stages and switches, that is $N \cdot \log N - N/2$ switches. Because of its self-similarity it can be modularly extended. It has low meshing between the stages (i.e. few line intersections) and this is advantageous from the constructional point of view.

The Benes network consists of two mirror-symmetrical baseline networks. The baseline network is known and in addition will be briefly explained below. Since for reasons of the working speed the switches of the interconnection networks consist in many uses of semiconductor devices, such as transistors, the two mirror-symmetrical baseline networks of the Benes system are usually constructionally different. For purposes of the description and claims, the term "network of Baseline configuration" and the term "baseline network" are defined as a network of the form illustrated in FIG. 5.7 (a) at page 338 of the text *Computer Architecture and Parallel Processing*, K. Hwang & F. A. Briggs, Mc Graw Hill International Editions, Computer Science Series (1984). A network as defined is also illustrated in Wu & Feng, *On a class of Multistage Interconnection Networks*, IEEE Transactions on Computers, Volume C-29, No. 8, page 109, FIG. 3 (August, 1980).

SUMMARY OF THE INVENTION

The invention characterized in the claims solves the problem of providing an interconnecting network which in addition to the advantages of the Benes network has the further advantage that it contains two identical assemblies and can therefore be made in simpler and more economic manner. It can be proved that the interconnecting network according to the invention is also blockage-free.

The interconnecting networks according to the invention can be used just like crossbar switches in telecommunications and telephone switching technology in particular where easy extendability and low costs are decisive. A further important use is in the technology of data processing systems. The interconnecting networks according to the invention can be used with particular advantage in parallel computers in which a plurality of processors must be connected together or to memories in blockage-free manner. The extendability using existing parts permits a parallel-computer system which can be extended in its performance to meet a growing computer need. Another important field of use are computers for highspeed Fourier transformations.

BRIEF DESCRIPTION OF THE DRAWINGS

Hereinafter examples of embodiment of the invention will be explained in detail with reference to the drawings, wherein:

FIGS. 6-8, 9A-9C, and 10-16 are flow diagrams for the setting of the switches.

DESCRIPTION OF THE PREFERRED EMBODIMENTS

Figure 1:
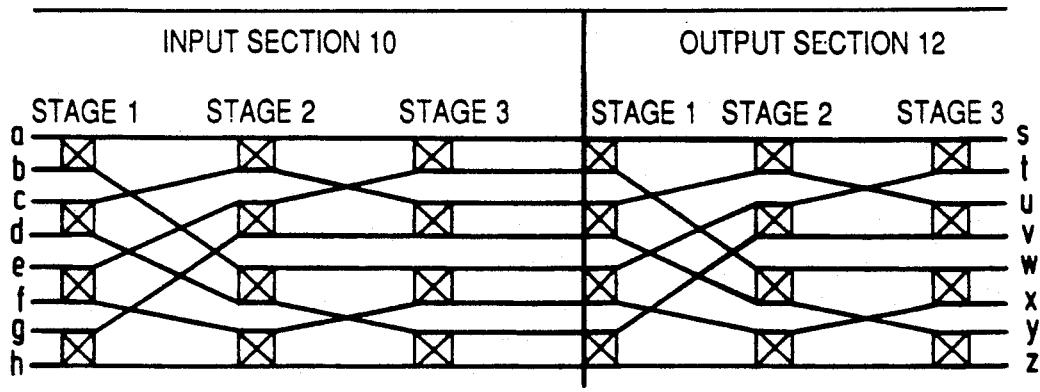
FIG. 1 shows an interconnecting network according to the invention having eight inputs and eight outputs.

FIG. 1 shows an example of embodiment of an interconnecting network according to the invention having eight inputs (a, b, ... h) and eight outputs (s, t, ... z). The interconnecting network according to FIG. 1 consists of two threestage baseline networks which are connected with the same orientation in series and which form an input section 10 and an output section 12 of the interconnecting network. The baseline networks contain switches("cross switches") represented by a square, each have two inputs and two outputs and are controllable by a control circuit (not shown) in such a manner that the two inputs are connected to the two outputs either in parallel or crossed. The control circuit may contain a computer or a read-only memory.

The so-called baseline network has the following fundamental structure: the number of inputs is a power of two. The inputs are each connected in pairs (a, b; c, d; e, f; ...) to a switch which connects its two inputs selectively in parallel or crossed to two switch outputs in dependence upon a control signal. A baseline network having $2^n$ inputs has n stages each of $2^n/2$ switches. The switches of the first and second stages are connected together in such a manner that the signals applied to the inputs of a switch of the first stage can be supplied to a switch in the upper half and to a switch in the lower half of the second stage. The switch position governs which of the two input signals is supplied to the switch of the upper half and which input signal to the switch of the lower half of the second stage. The switches of the upper half of the second stage are connected to the switches of an upper and lower quarter of the upper half of the third stage in analogous manner so that the signals applied to the inputs of a switch of the second stage are supplied respectively to a switch in the upper and in the lower quarter of the upper half of the third stage. The same applies to the lower half of the switches of the second stage. The same scheme then applies as well to any further stages.

Since in the interconnecting network according to the invention shown in FIG. 1 the input section 10 and the output section 12 are the same, this interconnecting network may be made up from two identical modules. The last, i.e. the third, stage of the input section 10 is however not fundamentally necessary and may therefore be omitted. Consequently, for the input section a so-called "reduced baseline network" can be used. If it is desired to utilize the advantages of a modular structure in such a case as well, identical modules are then required only for the respective first to penultimate stage, i.e. in FIG. 1 for the first and second stage ("reduced baseline network") and for the last stage, i.e. in FIG. 1 the third stage, of the output section a suitable circuit section or module is provided. The modules may for example consist of printed-circuit boards or integrated circuits.

Figure 2:
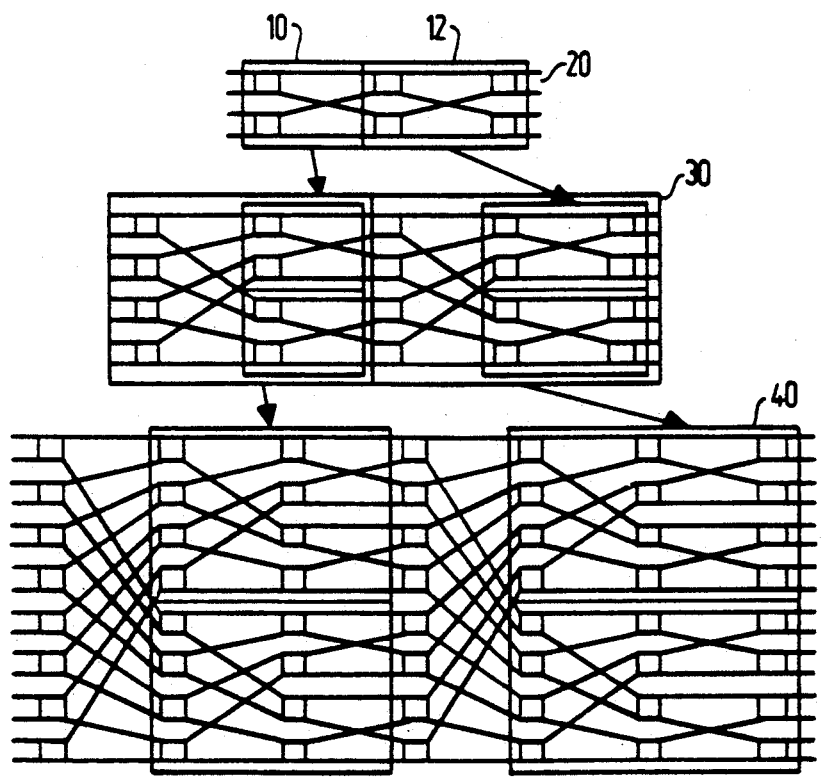
FIG. 2 is an illustration showing with reference to interconnecting networks according to the invention having four, eight and sixteen inputs and outputs how the interconnecting network according to the invention can be extended.

FIG. 2 shows how an interconnecting network 20 according to the invention having four inputs can be extended to an interconnecting network 30 according to the invention having eight inputs and the latter in turn to an interconnecting network 40 according to the invention having sixteen inputs. The interconnecting networks 20, 30 and 40 each contain as input section a reduced baseline network, i.e. a baseline network in which the last stage is lacking; the latter is however present in the output section.

It can be seen from FIG. 2 that the extending interconnecting networks each contain the modules or constructional units of the next smaller interconnecting networks in unchanged form. The interconnecting network according to the invention can thus be extended in simple and economical manner.

Figure 3:
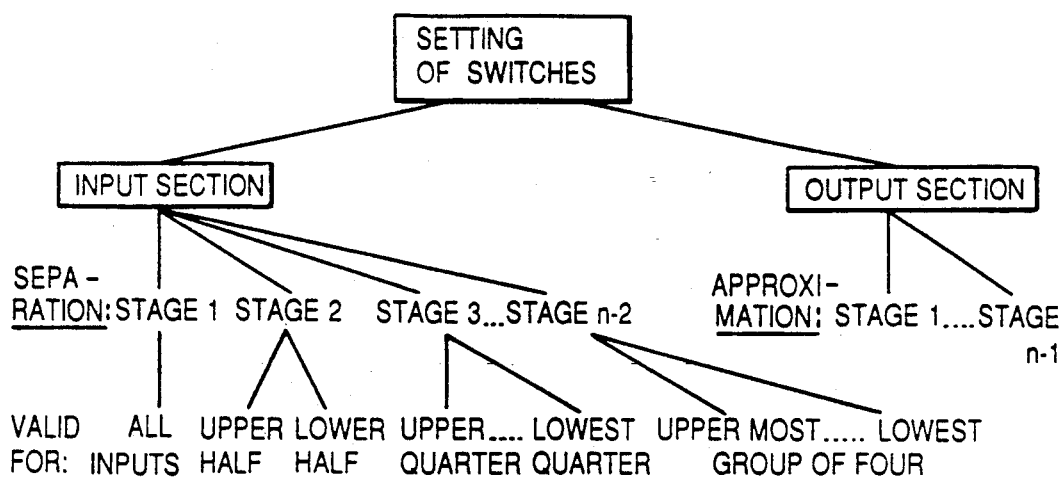
FIG. 3 is a graphical representation of the principle of the switch setting.

Below, with reference to FIGS. 3 to 5 it will be explained how the setting of the switches is determined for a predetermined permutation P between the inputs and outputs of an interconnecting network according to the invention. This is also illustrated in the flow charts of FIGS. 6 to 16.

THE SETTING OF THE SWITCHES

The switch positions of the input section and the output section of the network are determined by two different methods. Common to both methods is that the switch positions are calculated stepwise from left to right progressively in their alternatively possible positions, i.e. "parallel" ("=") or "crossed" ("x"). The algorithm of the input section is however varied from stage to stage: the validity range of its application diminishes as is shown fundamentally in FIG. 3. Thus, the algorithm of the input section is applied, progressively from stage to stage, in each case to half the number of its preceding range of switches, i.e. the validity range of the "partition" algorithm of the input section extends in the first stage to all the switches of said state; in the second stage to the respective upper and lower half, and so on. After introducing some terminology this situation will be described in more detail.

1. THE ALGORITHM OF THE INPUT SECTION

The purpose of the algorithm is to calculate from a given permutation P of connections between inputs and outputs of the network with $$P = \begin{pmatrix} I_{N-1} \\ I_{N-2} \\ \cdot \\ \cdot \\ \cdot \\ I_0 \end{pmatrix} \quad \begin{array}{l} I_i \in \{0,1,2,\ldots,N-1\} \\ N: \text{network size. } N = 2^n \end{array}$$

The switch positions of each stage s (s = 0, 1, 2, ..., n−2). For this purpose the algorithm starts on the input side of the network (on the left in FIG. 3) with the first stage (s=O) and ends with the (n−1)th stage (s=n−2). It is valid for each power of two of the inputs N. For exact accounting of the sequence at the beginning all the switches of the network are marked "unset" and all the inputs of the switches "unassigned". At the end all the switches are set and all the inputs assigned. Furthermore, the inputs are denoted from the top to the bottom continuously by A = 0, 1, 2, ..., N−1. These numbers are referred to hereinafter as the addresses of said inputs. The algorithm is now based on the fact that the numerical values $I_i$ of the permutation vector P are "applied" to the inputs of the switches and thus transported, depending on the switch position, from stage to stage through the entire network. Consequently, at each input A a numerical value I is present which hereinafter will be denoted the "content" of the address A. Associations with the contents and addresses of memories and computers are certainly possible in this context because this algorithm involves the sorting of numbers carried out with the aid of the input section of the network. The switch positions then occur as it were as "by-product". Furthermore, a permutation of the input vector appears at the output of the input section. At the output of the output section, i.e. of the network, said vector is finally sorted because each content has arrived at "its" address.

An important difference between the two algorithms for the input and output sections resides in that in the case of the input section, similarly to the address ranges, from stage to stage less bits of the binary representation of I are relevant:

In the first stage (s = 0) all n bits of the contents I with $$I = i_{n-1}, i_{n-2}, \ldots, i_0$$

are considered; in the second stage only the n−1 more significant bits, in the third stage the n−2 more significant bits, and so on. It should be remembered that for the addresses A with $$A = A_{n-1}, A_{n-2}, \ldots, A_0$$

in the first stage all n bits are valid; in the second stage only the n−1 less significant bits apply as address range for the "partition" algorithm whilst the remaining most significant bit distinguishes the upper from the lower range. In the third stage (s=2) the n−2 lower bits denote the valid address range (a quarter) while the two most significant bits distinguish the ranges, and so on.

Now, it can be shown that for each content $I_s$ of the stage s within the address range thereof and with regard to the bits thereof considered there is exactly one content $\bar{I}_s$ of which the least significant bit is complementary to that of $I_s$ and of which the more significant bits are identical so that:

$$\bar{I}_s/2 = I_s/2.$$

The content $I_s$ is designated the "complement" of $I_s$.

Now, each of the two contents $I_s$ and $\bar{I}_s$ has a certain address, i.e. is applied to the upper or lower input of a cross switch. The contents at the second inputs of the switches of $I_s$ and $\bar{I}_s$, now play an important part. They will be denoted hereinafter by $I'_s$ and $\bar{I}'_s$. Starting from a complement pair $I_s$ and $\bar{I}_s$ the algorithm now starts to search for the complements of $I'_s$ and $\bar{I}'_s$ in order to form in this manner two new complement pairs. The contents at the two inputs of said switches in turn permit two further pair formations, and so on. The procedure ends when all the complement pairs have been formed. For convention reasons as starting value the first unassigned $I_s$ "from above" is chosen, i.e. that with a "small" address A. The search for a free $I_s$ is always conducted from the top to the bottom.

Now, the purpose of the "number sorter" is to partition the contents of a complementary pair by corresponding setting of their switches amongst the upper and lower half of the address range in the next stage. A help in doing this is the selection of the wiring between the stages so that the one output of a switch is directed to the upper and the other output to the lower half of the address range so that the contents are partitioned into different halves on transition to the next stage with the correct switch position.

If the degree of freedom exists permitting disposition of both switches, that of $I_s$ and that of $\bar{I}_s$, for convention reasons the switch of $I_s$ is set to "=". This uniquely defines the position of the switch of $\bar{I}_s$.

It has been shown that the partition of "complementary" numbers is possible with the aid of a baseline network. By the additionally effected definition of the switch positions in the case of one degree of freedom and by the defined search directions the algorithm defined for this purpose in the Appendix also provides the same of all possible solutions each time.

Figure 4:
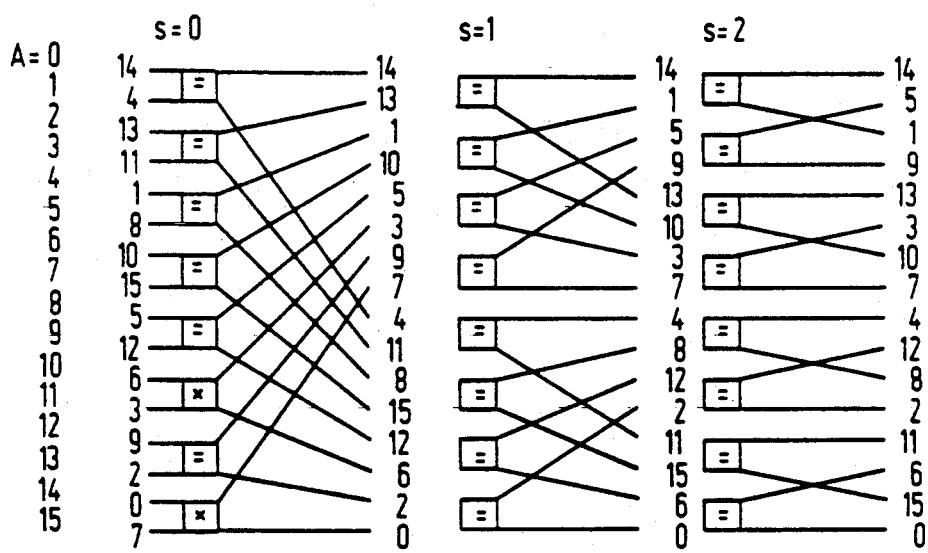
FIG. 4 is an example of the switch settings in an input section having 16 inputs and outputs.

FIG. 4 shows an example of a 16 input section and the permutation:

P=(14,4,13,11,1,8,10,15,5,12,6,3,9,2,0,7).

2. METHOD OF SETTING THE SWITCHES OF THE OUTPUT SECTION

The purpose of this algorithm is to calculate the positions of the switches of the output section starting from the permutation of P predefined at the output of the input section. The algorithm is based on the known principle of successive approximation. The new aspect is that this can be carried out on a baseline network. For this purpose the input vector into the baseline network must be provided with an additional property, the "bit compatibility" of its elements. This is furnished by the preceding input section which performs a partition of the contents with complementary bits to "harmless spacing".

As with the input section the stages are numbered from left to right with $s=0,1,...n-1$ and the inputs of all the stages with $A=0,1,...N-1$. In exactly the same manner the contents I of the addresses A of a stage are transported to the next stage after positioning the switches. At the output of the network the contents are sorted.

Furthermore, for calculating the position of a switch only one of the two contents at said switch is relevant. For convention reasons for this purpose the upper content is employed. Of the upper contents, in turn for switch position calculating in each stage only one bit of the binary representation of I is used, with $I = i_{n-1}, i_{n-2}, ..., i_1 i_0$.

In the first stage for example the most significant bit ($i_{n-1}$) of the contents I of the switches is relevant. For the second stage the relevant bit is $i_{n-2}$, for the third the bit $i_{n-3}$, etc. If, generally speaking, in the stage s the bit $i_{n-1-s}=1$, the switch is set to "x" and otherwise to "=". By progressive halving of its destination area after n stages the content I has then "reached" one of the $2^n$ outputs (successive approximation).

Figure 5:
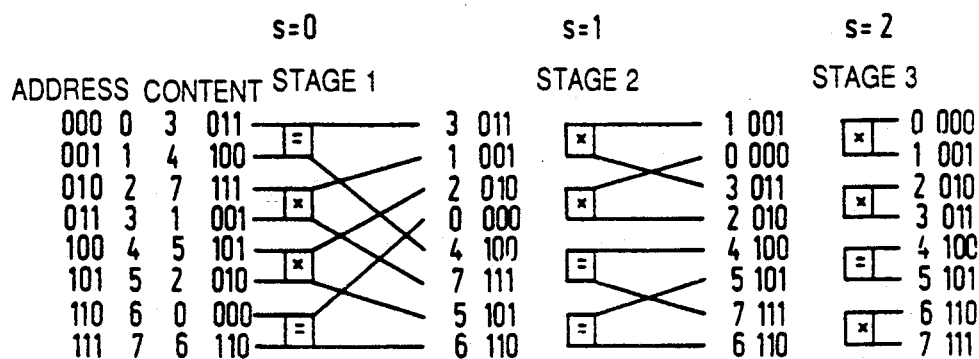
FIG. 5 is an example for the switch settings in an output section having 8 inputs and outputs.
Figure 6:
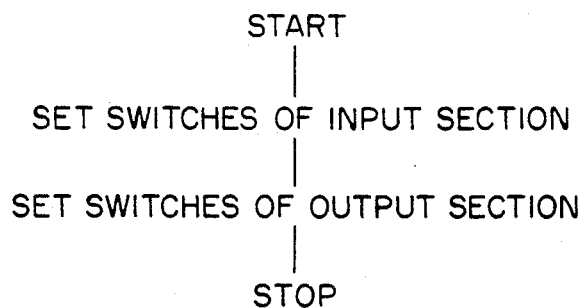
Figure 7:
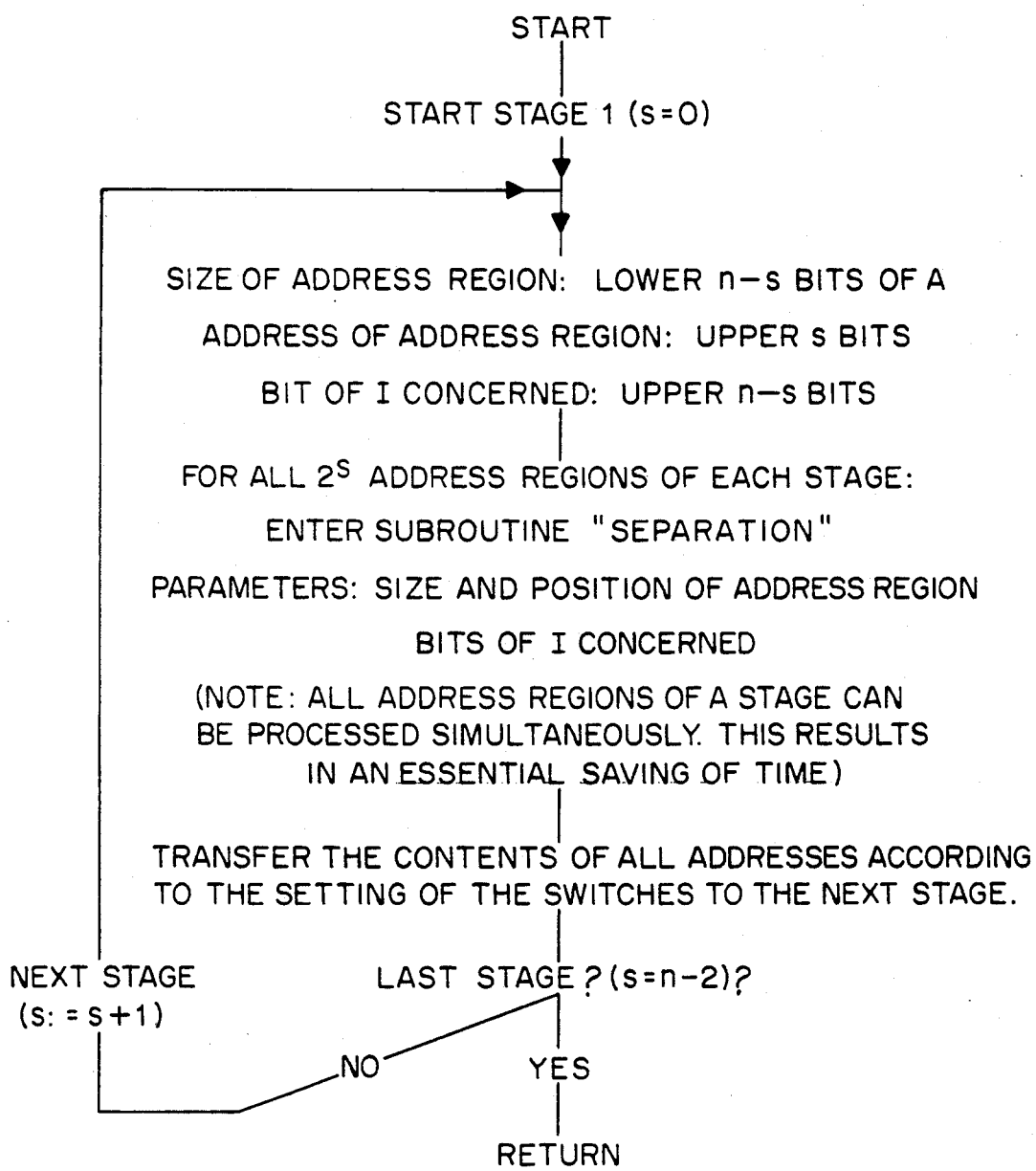
Figure 8:
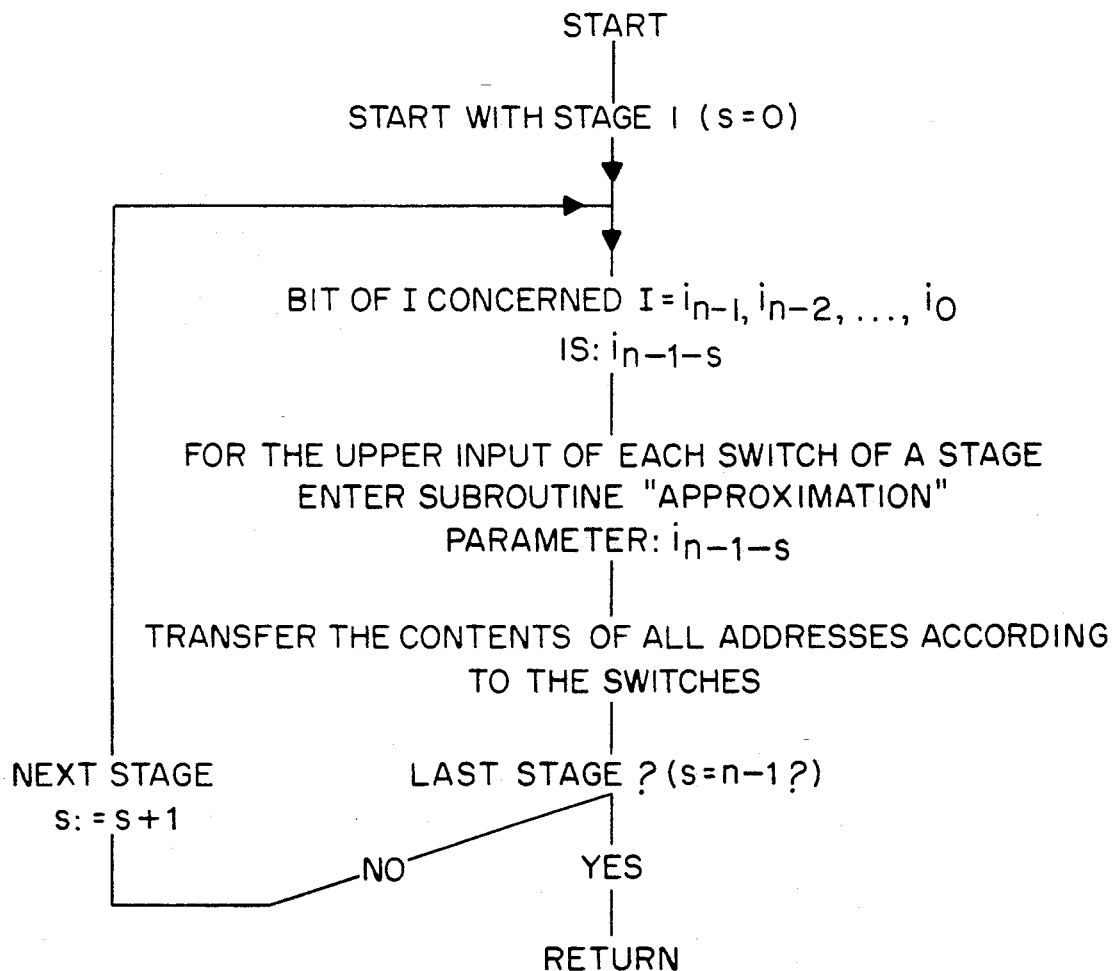
Figure 9A:
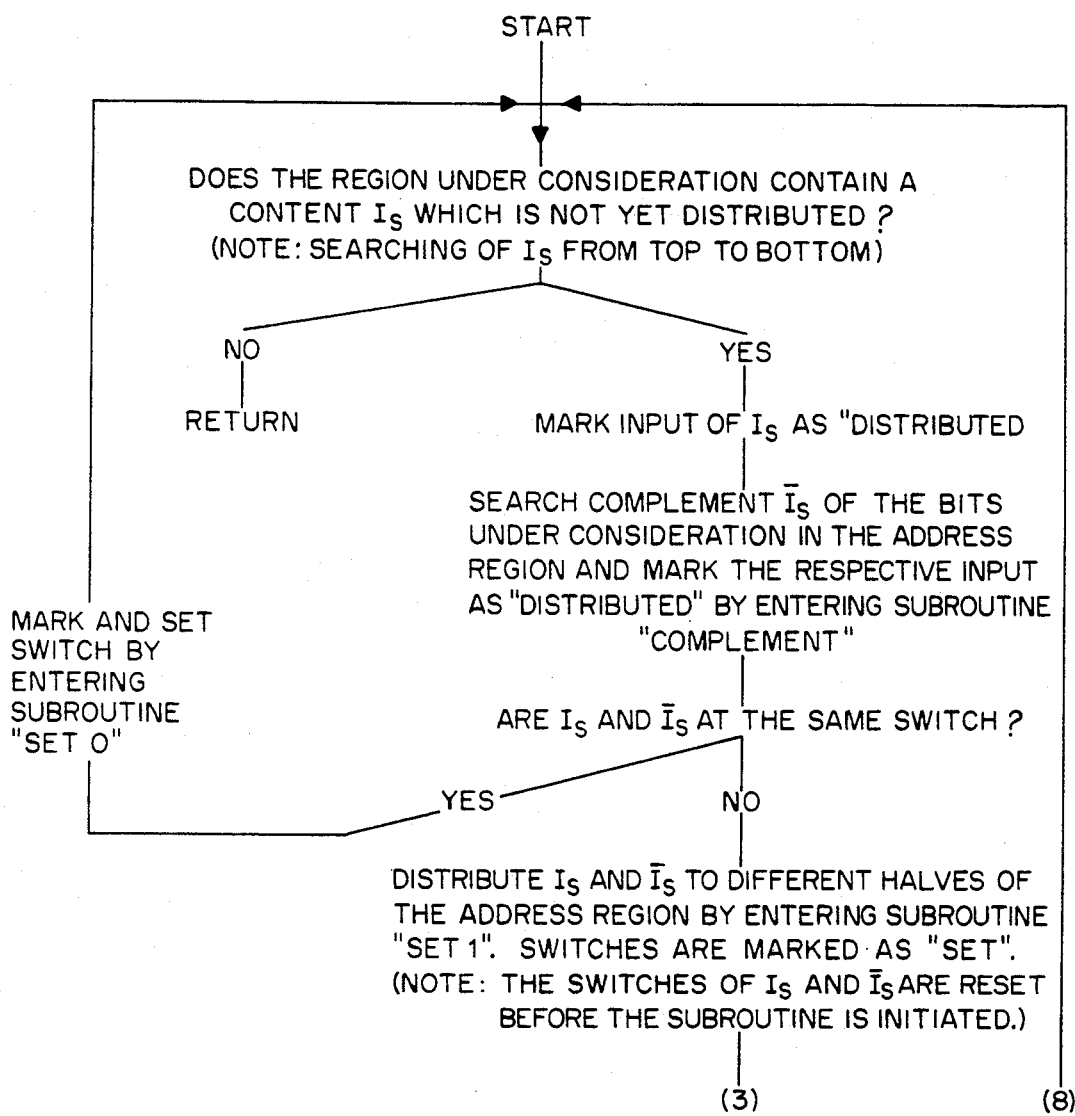
Figure 9B:
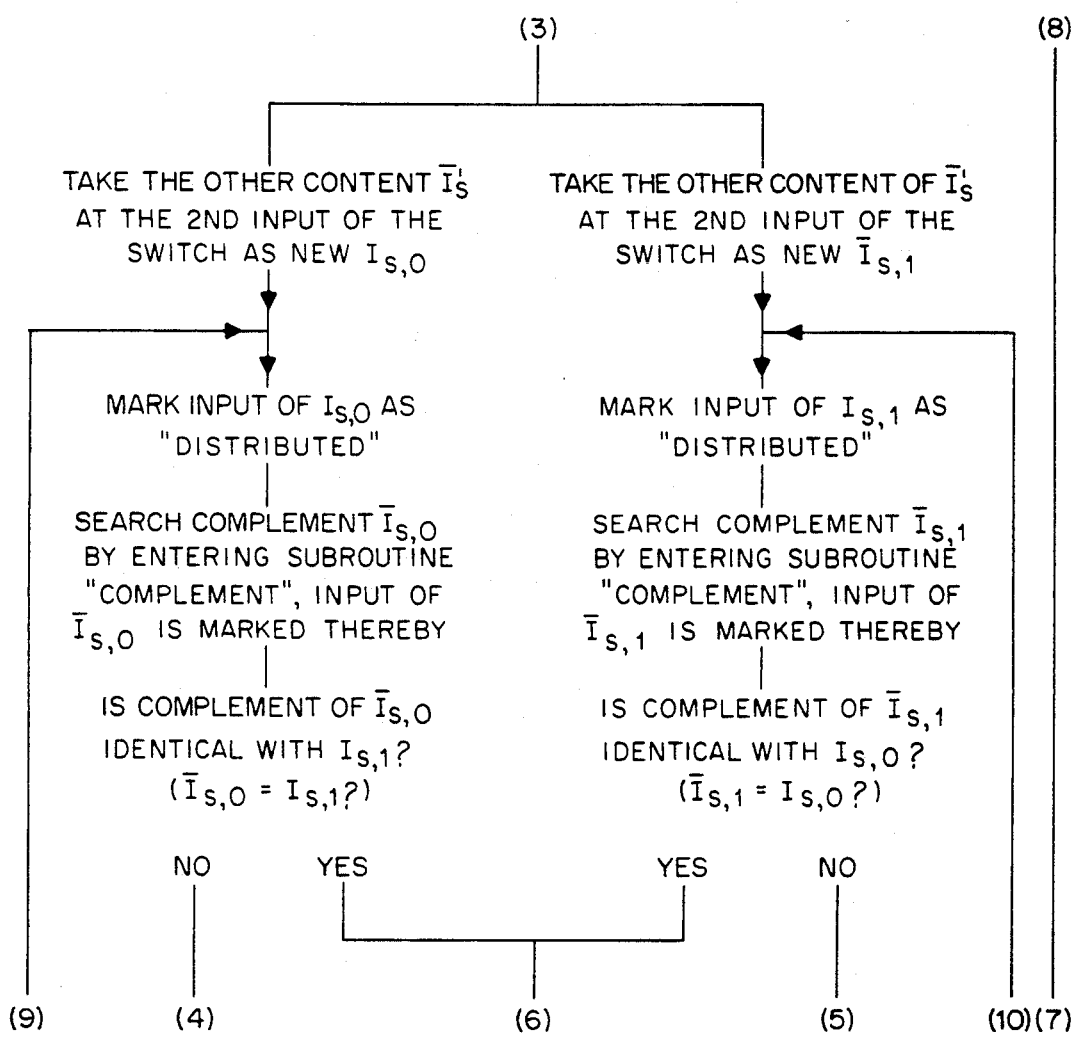
Figure 9C:
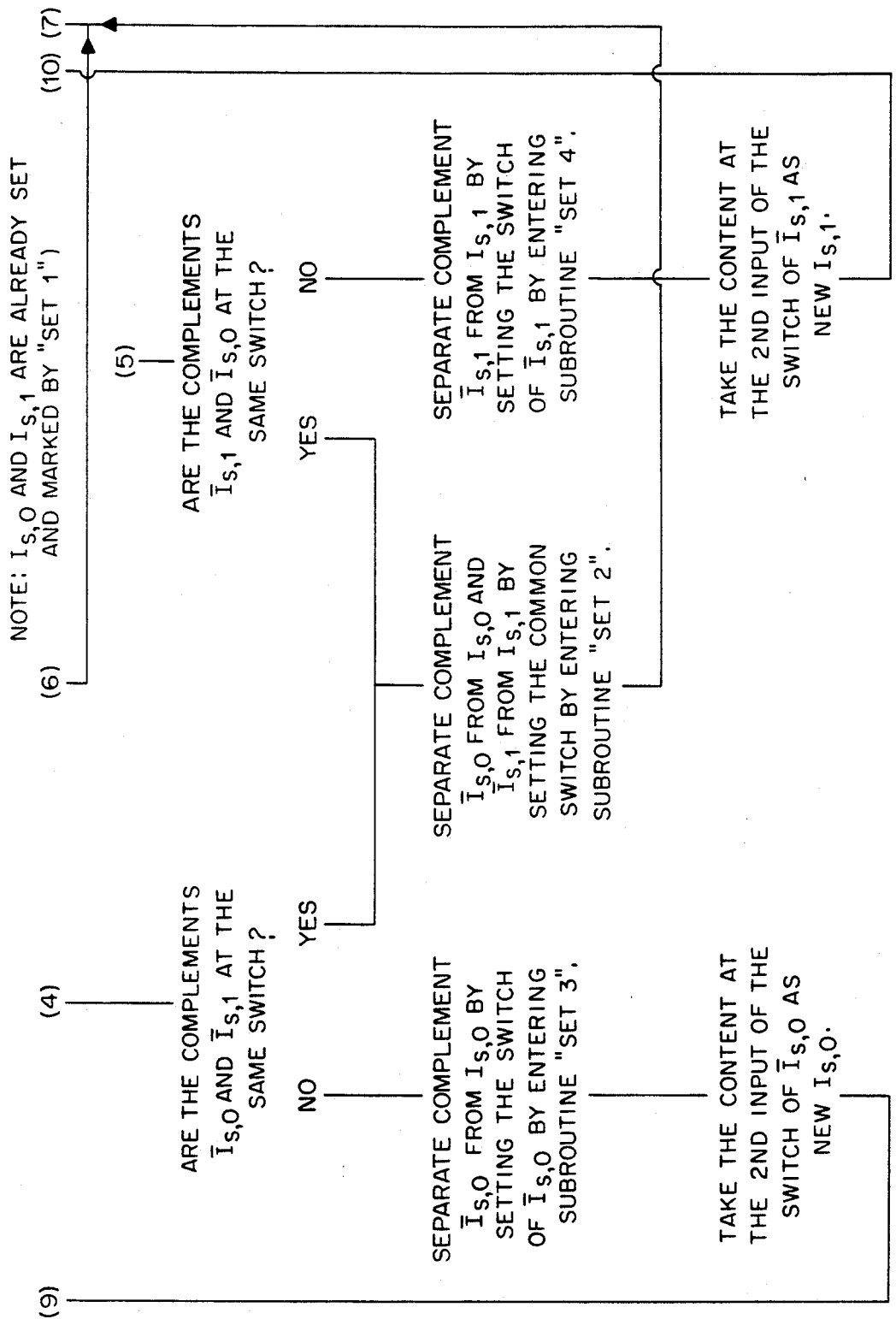
Figure 10:
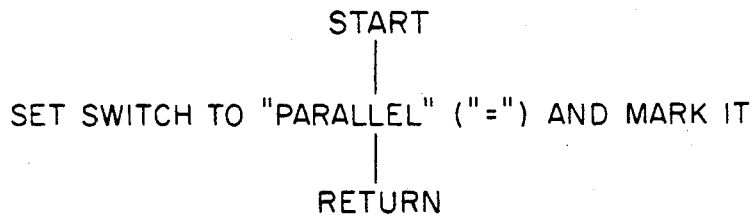
Figure 11:
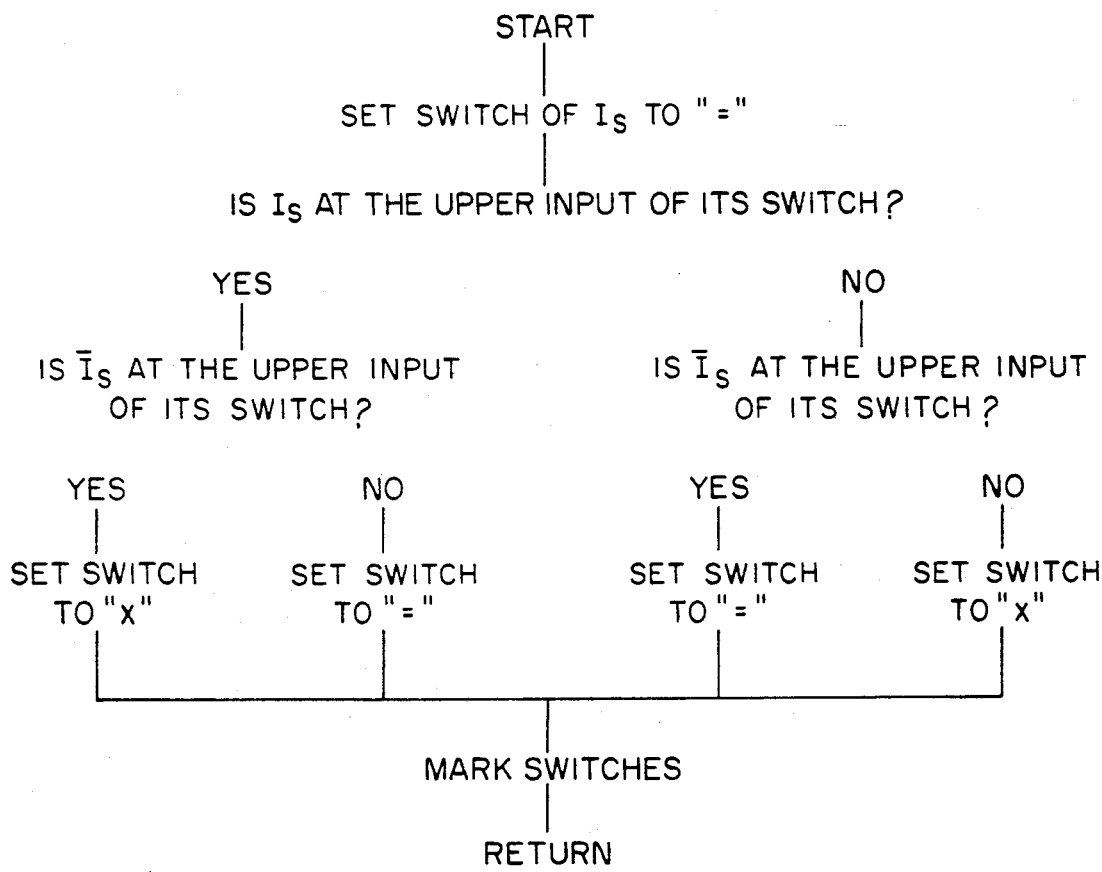
Figure 12:
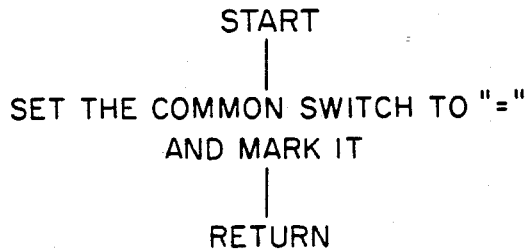
Figure 15:
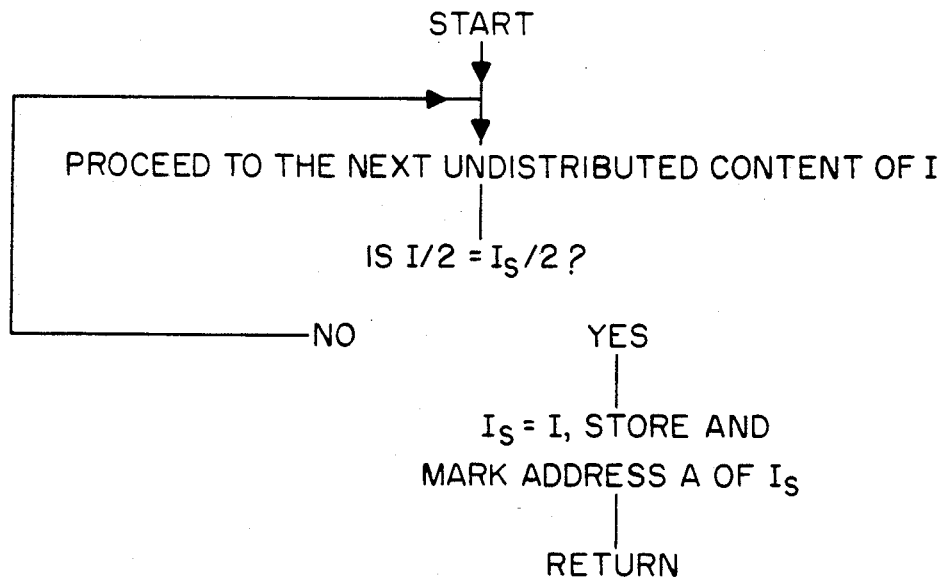
Figure 16:
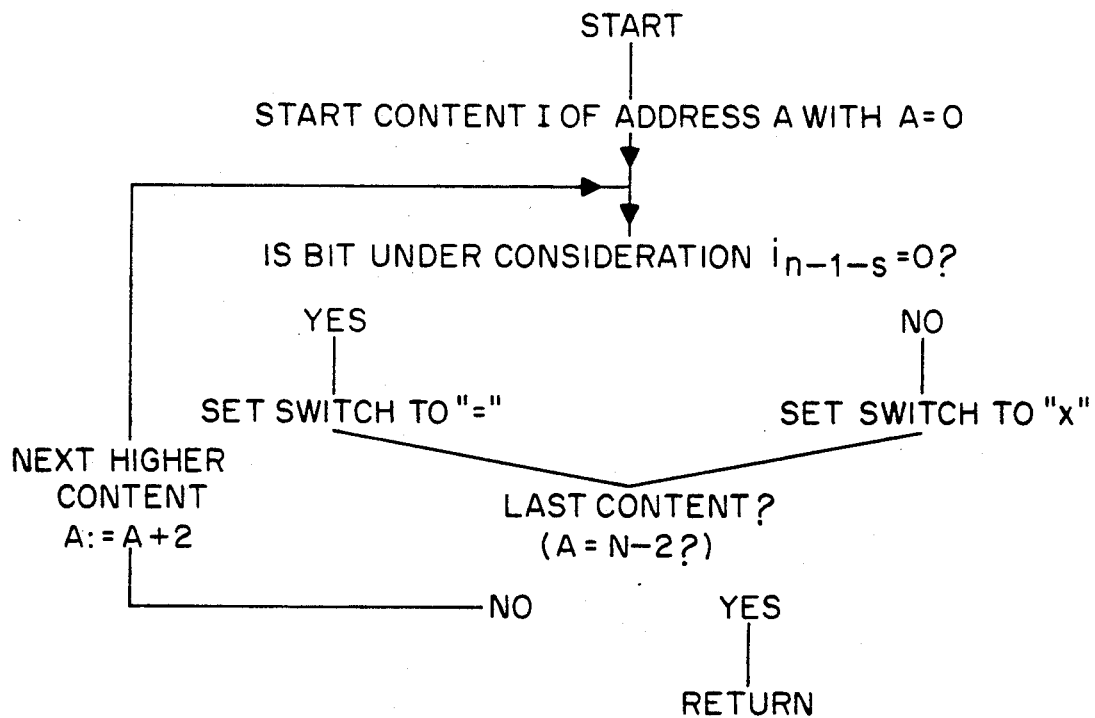

FIG. 5 shows an example of an output section having eight inputs and eight outputs.

FIGS. 6-16 are flow diagrams for the setting of the switches.

I claim:

1. An interconnecting network, for permitting simultaneous selective non-blocking connection of each one of $2^n$ inputs to any exclusive one of $2^n$ outputs to provide a locked circuit path with physical continuity between said one of the inputs and said exclusive one of said outputs, comprising:

an output section in one the form of an n stage circuit switching network of Baseline configuration having $2^n$ inputs and $2^n$ outputs and wherein each stage includes $2^n/2$ crosspoint switching devices coupled in an unshuffle permutation arrangement in which meshing of interconnection is successively reduced from stage to stage and wherein each of said crosspoint switching devices simultaneously provides two isolated paths for either parallel or cross-over connection between two inputs and two outputs of such device, with each input connected with physical continuity to a single output; and and input section in the form of a circuit switching network of Baseline configuration comprising at least $n-1$ stages, each having crosspoint switching devices and a switching topology respectively identical to the corresponding stage of said output section and having $2^n$ inputs and $2^n$ outputs coupled individually to the inputs of said output section so that each of said input section inputs can be simultaneously connected to a different one of said output section outputs, with each input connected with non-blocking physical continuity to a single output.

2. An interconnecting network according to claim 1, wherein the input section and the output section each contains the same number of stages.

3. An interconnecting network according to claim 1, wherein the input section lacks a last stage corresponding to the last stage of the output section, so that the input section is limited to $n-1$ stages.

4. An interconnecting network, for permitting simultaneous selective non-blocking connection of each one of N inputs to any exclusive one of N outputs to provide a locked circuit path with physical continuity between said one of the inputs and said exclusive one of said outputs, comprising:

an output section in the form of a circuit switching network of Baseline configuration having first to n-th stages and N inputs and N outputs, each stage including $2^n/2$ crosspoint switching devices each simultaneously providing two isolated paths for either parallel or crossover connection between two inputs and two outputs of such device, with each input connected with physical continuity to a single output, the switching devices of the first stage being connected so that each device in the first stage is coupled to a device in the upper half and a device in the lower half of the second stage, each switching device in the upper half of the second stage is coupled to a device in the upper quarter and a device in the lower quarter of the upper half of the third stage, and this intercoupling arrangement is extended for each further stage; and an input section in the form of a circuit switching network of Baseline configuration comprising at least first to $n-1$ stages of an n-stage Baseline network, each having crosspoint switching devices and a switching topography respectively matching the corresponding stage of said output section and having N inputs and N outputs coupled individually to the N inputs of said output section, so that each of said input section inputs can be simultaneously connected to a different one of said output section outputs, with each input connected with non-blocking physical continuity to a single output.

5. An interconnecting network according to claim 4, wherein the input section and the output section each contains the same number of stages.

6. An interconnecting network according to claim 4, wherein the input section lacks a last stage corresponding to the last stage of the output section, so that the input section is limited to $n-1$ stages.

7. An interconnecting network, for permitting simultaneous selective non-blocking locked connection of each one of M inputs to any exclusive one of M outputs, comprising:

input and output stages each including a plurality of n stage baseline networks according to claim 4 for permitting connections between N inputs and N outputs, where N is smaller than M by a power of two.

8. An interconnecting network according to claim 4, wherein the input section is identical to the first through $n-1$ stages of the input section.

9. An interconnecting network according to claim 4, wherein the input section and the output section consist of identical networks of Baseline configuration.

10. An interconnecting network according to claim 4, wherein the number of inputs N is equal to $2^n$.

* * * * *

UNITED STATES PATENT AND TRADEMARK OFFICE
CERTIFICATE OF CORRECTION

PATENT NO. : 5,175,539
DATED : December 29, 1992
INVENTOR(S) : Harald Richter

It is certified that error appears in the above-identified patent and that said Letters Patent is hereby corrected as shown below:

Column 4, last line, "$I_s/2 = I_s/2$" should read --$\bar{I}_s/2 = I_s/2$--;

Column 5, line 1, "$I_s$" should read --$\bar{I}_s$--;

Column 5, line 19, "the contents" should read --the two contents--;

Column 6, line 23, "in one the" should read --in the--;

Column 6, line 36, "and input" should read --an input--.

Signed and Sealed this

Sixteenth Day of November, 1993

BRUCE LEHMAN

*Attest:*

*Attesting Officer*  Commissioner of Patents and Trademarks